F. MÜLLER.
MILLING CUTTER.
APPLICATION FILED MAR. 26, 1920. RENEWED JULY 19, 1922.
1,429,618.
Patented Sept. 19, 1922.
4 SHEETS—SHEET 1.
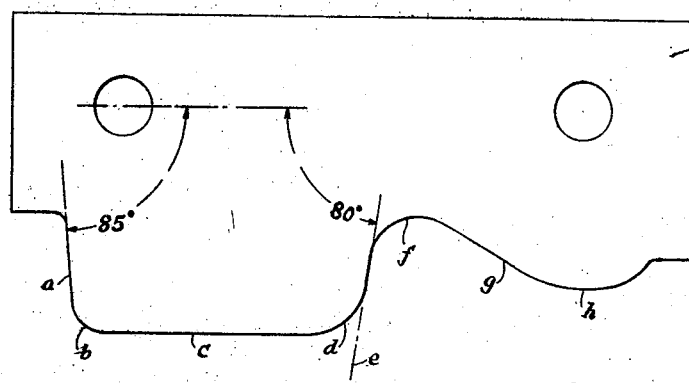
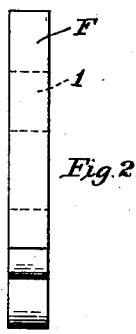
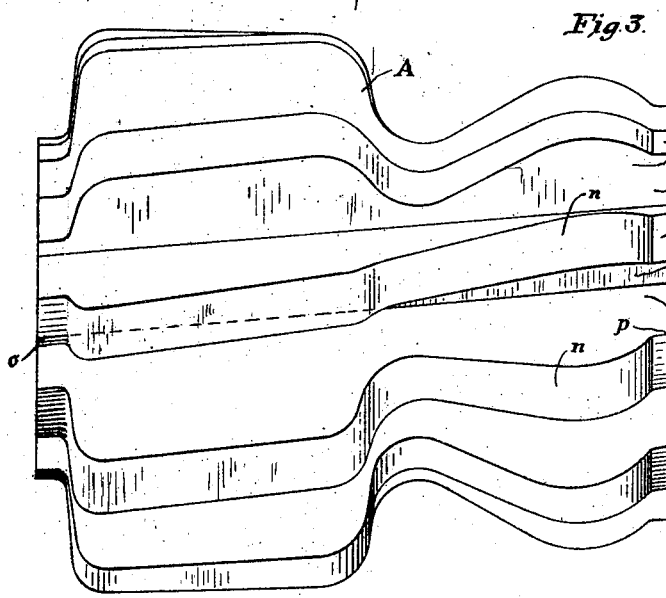
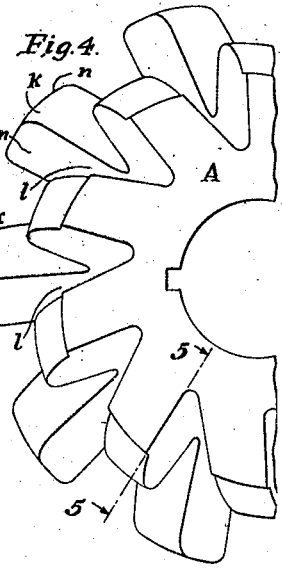
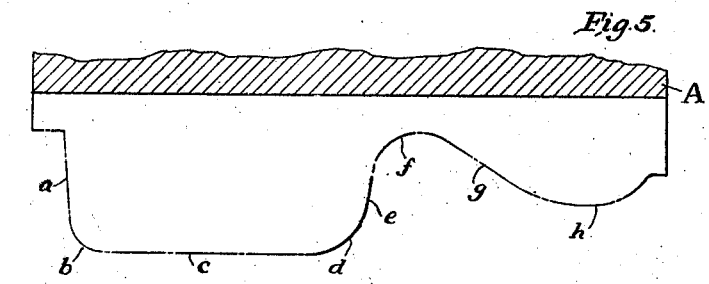
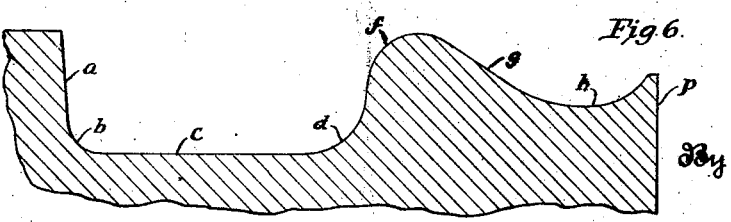
Inventor
Friederich Müller
By S. Jay Teller
Attorney

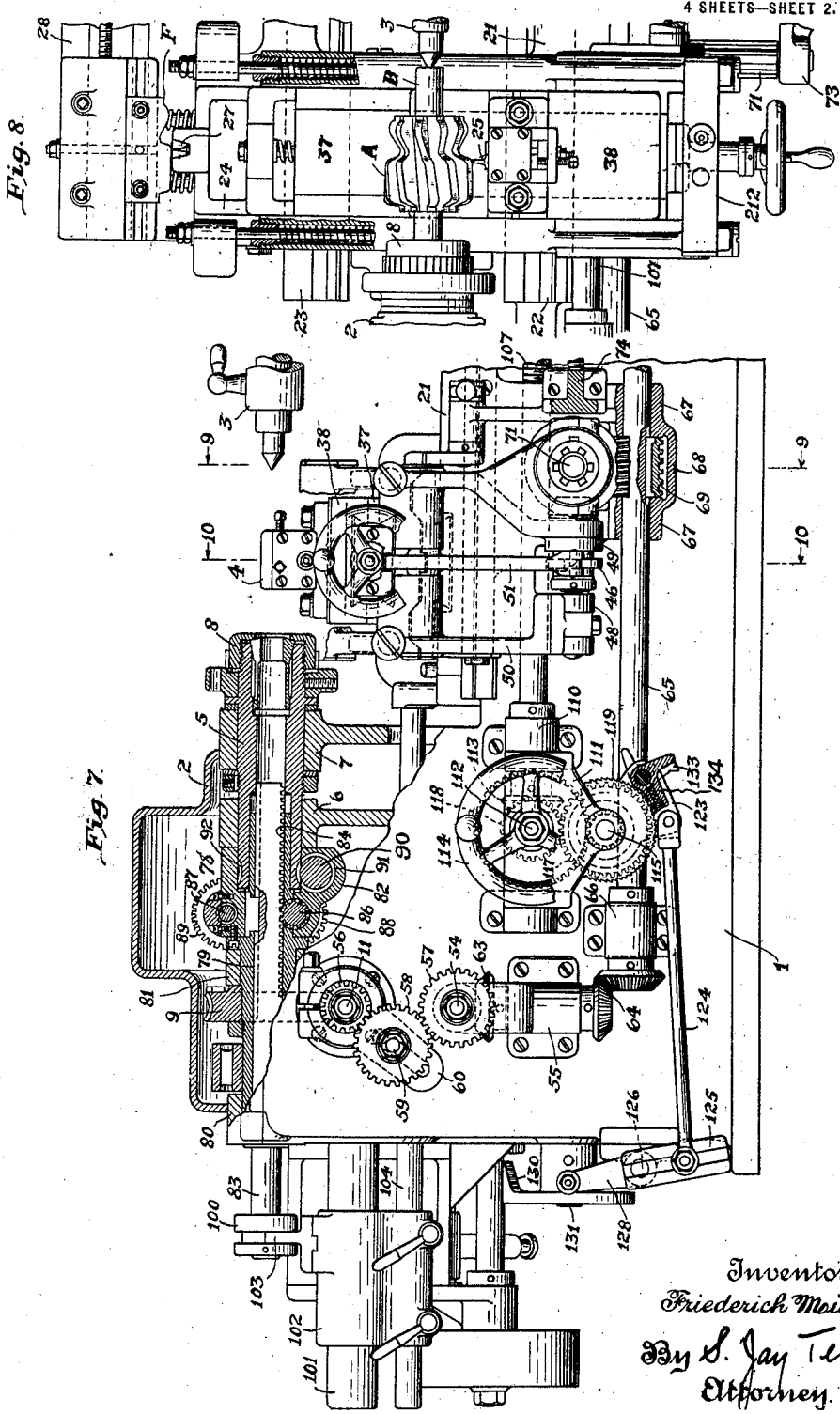

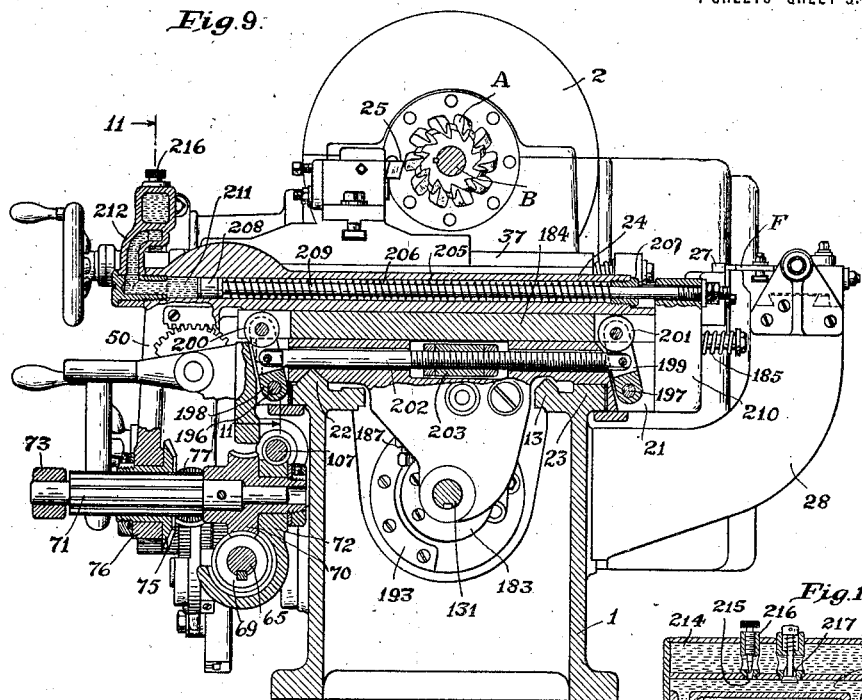
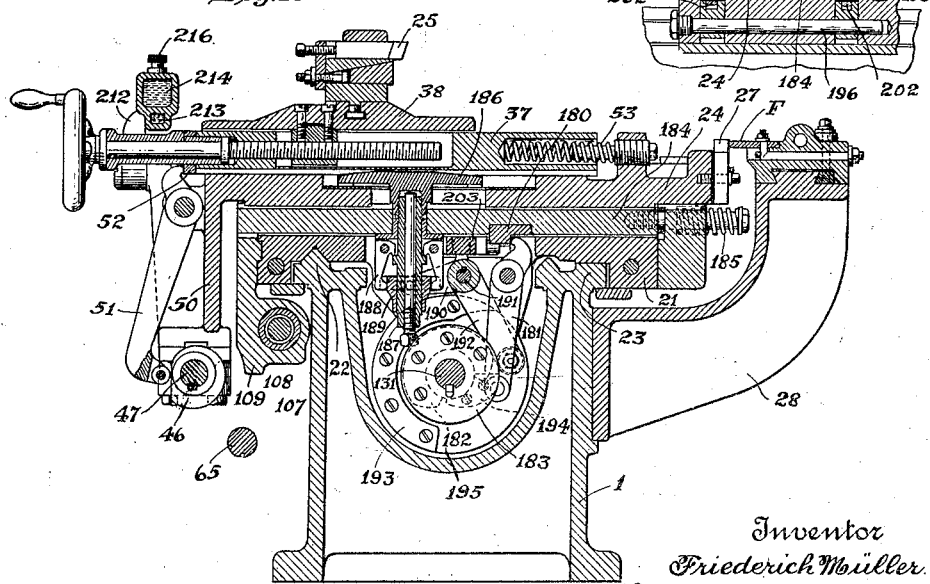

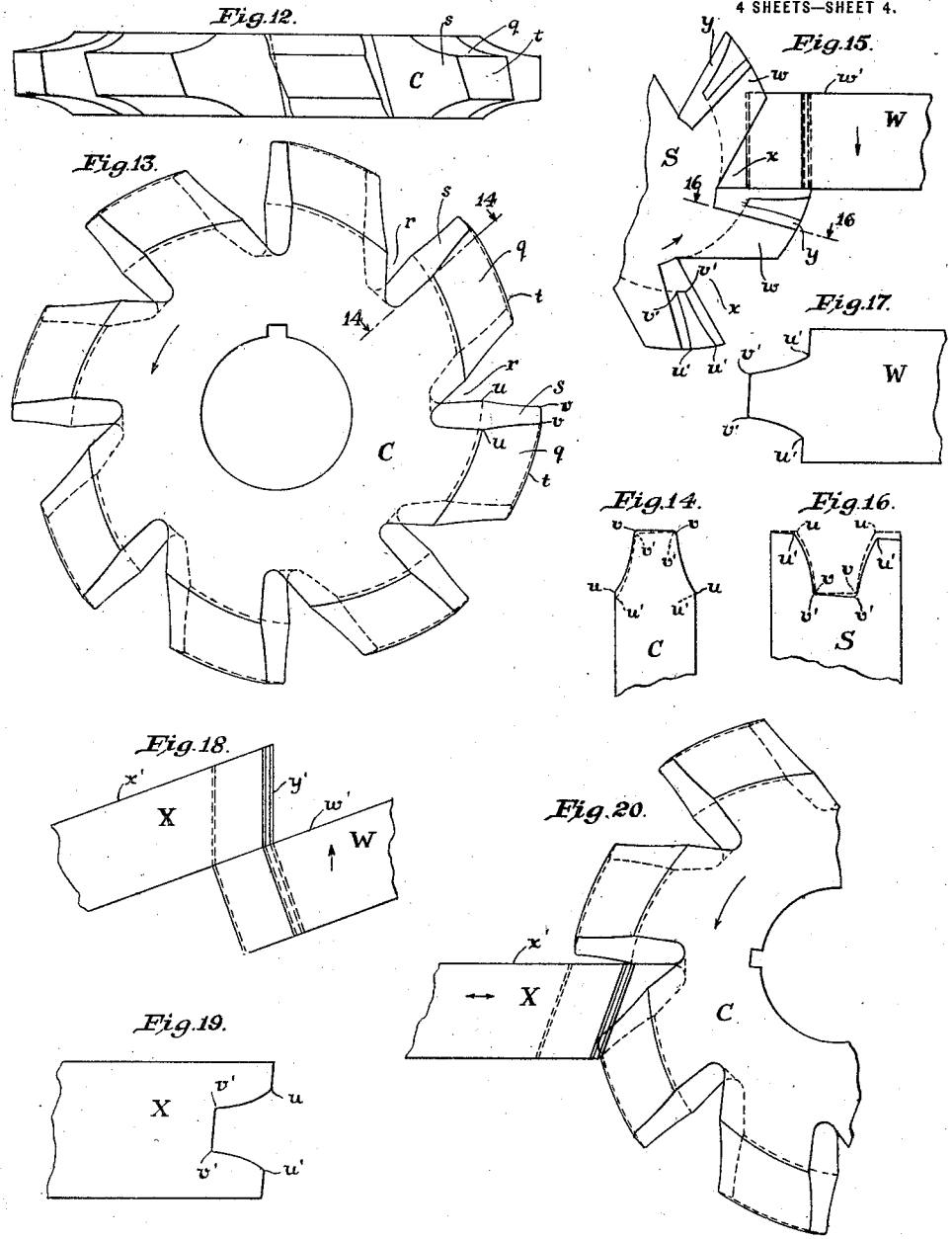

Patented Sept. 19, 1922.

1,429,618

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MILLING CUTTER.

Application filed March 26, 1920, Serial No. 368,928. Renewed July 19, 1922. Serial No. 576,160.

*To all whom it may concern:*

Be it known that I, FRIEDERICH MÜLLER, a citizen of the United States, residing at Hartford, in the county of Hartford and State of Connecticut, have invented certain new and useful Improvements in Milling Cutters, of which the following is a specification.

This invention relates to milling cutters of the type set forth in my Patent No. 1,348,295, dated August 3, 1920. Such a milling cutter is adapted to cut a predetermined contour other than a straight line and has its teeth inclined with front cutting faces of the teeth conforming to helicoids and has the outer surfaces of the teeth properly relieved preferably spirally. It is the general purpose of the present invention to provide an improved cutter of the type set forth and claimed in the said patent, the improved cutter avoiding certain prior limitations as concerns the character of the contour.

The methods in the said application disclosed for making the cutter shown therein are such that there is either a necessary and relatively restricted limitation upon the maximum angle between any part of the contour and the cutter axis, or a necessary and relatively restricted limitation as to the minimum distance between the back part of one tooth and the front part of the next following tooth. In accordance with one method presented in the said patent the cutter was formed by a preliminary shaped milling cutter having a length equal to that of the final cutter. Clearly a cutter made in accordance with this method necessarily had a considerable space between the rear part of one tooth and the front part of the next following tooth in order that the milling cutter might properly clear. In accordance with another method set forth in the said patent the cutter was made from a former having the desired contour, a lathe tool being provided in position to engage the cutter blank and a former pin being provided having the same shape as the lathe tool and adapted to engage the former. The cutter blank was rotated and the tool was reciprocated with respect to the pin in such a way as to properly relieve the several teeth, and at the same time the lathe tool and the former pin were fed longitudinally in unison, the former pin following the contour of the former and the lathe tool following a similar contour which it cut on the cutter. This method while entirely satisfactory for making a wide variety of cutters is nevertheless subject to the limitation that a longitudinally fed former pin will not follow outward along a part of the former which is inclined in excess of a certain critical angle. This critical angle may vary in accordance with varying conditions, but at best it could not be more than 60° and ordinarily would be considerably less. Furthermore with a cutter made in accordance with the said method there is a tendency for the cutter contour to vary from that of the former on account of varying deflection or distortion of the former pin and other parts. This varying deflection or distortion arises because of different pressures at successive parts of the contour because of different angles.

The object of the present invention is to provide a cutter of the type disclosed in and covered by my aforesaid patent but free from the limitations before referred to. A cutter embodying the present invention may have any part of its contour inclined with respect to the axis at any angle up to nearly 90°, and there is no limitation as concerns the distance between the rear part of one tooth and the front part of the next following tooth, and, in fact, it is entirely feasible to have the two said parts overlap. A further object of the invention is to provide in combination with a cutter such as described a preliminary former from which the cutter is made or a work piece cut by a cutter or both, the said preliminary former and the work piece having contours which are identical with each other and also identical with the effective contour of the cutter, which contours, as already stated, include parts which may be inclined with respect to the axis at large angles up to nearly 90°.

In accordance with the invention the contour of the cutter is an irregular one consisting of a variety of different elements such as straight lines and curves. This irregular contour is to be distinguished from a contour consisting merely of a uniform series of narrow elemental contours. A cutter such as a thread milling hob consisting of a series of narrow elemental contours is shown in my Patent No. 1,348,304, dated August 3, 1920, and such a cutter has some of the characteristics of the cutter herein shown and described but is necessarily limited to a succession of small elemental contours for the reason that so far as disclosed in the said patent it can be made only by means of a narrow shaped cutter or tool acting successively to form the several elemental contours. The present case is differentiated in that the cutter may, and in fact does, have a contour which is irregular or complex in any desired way and which is not a mere repetition of small simple contours.

In the accompanying drawings I have illustrated two forms of cutters embodying the invention and have shown how the cutters may be made. It will be understood, however, that the drawings are for illustrative purposes only and are not to be construed as defining or limiting the scope of the invention, the accompanying claims being relied upon for that purpose.

Of the drawings:

Figures 1 and 2 are plan and end views respectively of a former adapted for use in making a cutter embodying the invention.

Figs. 3 and 4 are side and end views respectively of a cutter made from the former and embodying the invention.

Fig. 5 is a developed fragmentary cross sectional view of the cutter shown in Figs. 3 and 4, the section being taken through the bottom of one of the longitudinal grooves along an helicoidal surface such as 5—5 indicated in Fig. 4.

Fig. 6 is a sectional view of a work piece cut by the cutter shown in Figs. 3 and 4.

Fig. 7 is a fragmentary combined elevational and sectional view of a machine adapted for use in making the cutter shown in Figs. 3 and 4 from the former shown in Figs. 1 and 2.

Fig. 8 is a fragmentary plan view showing a part of the machine illustrated in Fig. 7.

Fig. 9 is a sectional view of the machine taken along the line 9—9 of Fig. 7.

Fig. 10 is a sectional view of the machine taken along the line 10—10 of Fig. 7.

Fig. 11 is a fragmentary vertical longitudinal sectional view taken along the line 11—11 of Fig. 9.

Figs. 12 and 13 are side and end views respectively of another cutter embodying the invention.

Fig. 14 is a diagrammatic view illustrating certain features of the cutter shown in Figs. 12 and 13.

Fig. 15 is a diagrammatic view illustrating the step of forming an intermediate cutting tool adapted for use in making the cutter shown in Figs. 12 and 13.

Fig. 16 is a diagrammatic view illustrating certain features of the preliminary milling cutter shown in Fig. 15.

Fig. 17 is a plan view of the intermediate tool shown in Fig. 15.

Fig. 18 illustrates the intermediate tool shown in Figs. 15 and 17 in use for forming a lathe tool to be used directly for making the cutter shown in Figs. 12 and 13.

Fig. 19 is a plan view of the tool shown in Fig. 18.

Fig. 20 is a diagrammatic view illustrating the lathe tool shown in Figs. 18 and 19 in use for making the cutter shown in Figs. 12 and 13.

Figs. 1 and 2 of the drawings show a former F which consists of a metal or other plate of any convenient thickness. The former is suitably adapted to be secured to the machine which is to be used for making the cutter, and, as illustrated, the former is provided with two holes for this purpose. The front edge of the former is provided with an irregular contour which is exactly the same as the desired irregular contour on the work to be finally cut and which is therefore exactly the same as the effective contour of the cutter to be made. This irregular contour may vary widely within practical limits, but in accordance with the present invention it includes at least one line and usually two or more lines having angles with respect to the longitudinal direction which are in excess of the aforesaid critical angle which is the maximum angle at which a longitudinally fed former pin will follow outward. As already stated, the said critical angle will vary in accordance with varying conditions, but it would be not more than 60° and ordinarily would be considerably less. As before stated the contour is irregular and may consist of any desired combination of straight lines and curves, the latter being non-circular in form when desired. As illustrated, the contour includes a straight line $a$ inclined at an angle of about 85°, a circular arc $b$, a straight line $c$ extending in a longitudinal direction, circular arcs $d$ and $f$ which are tangent to a line $e$ inclined at an angle of about 80° but in the opposite direction from the line $a$, an inclined straight line $g$ and an elliptical curve $h$.

Referring next to Figs. 3 and 4, it will be seen that I have shown a cutter A which is shaped to cut the contour already described in connection with the former F. The cutter is provided with a plurality of generally longitudinal teeth $k$ between which are groves $l$, the teeth and grooves being preferably spaced uniformly. The grooves $l$ between the teeth can be of any usual or preferred depth and shape as required by the spacing and by the depth of the contour to be cut. The front wall $m$ of each tooth $k$ constitutes the cutting face thereof and this cutting face is radial or approximately so in order to provide a satisfactory cutting angle.

Each cutting face m is inclined or positioned obliquely so that its longitudinal lines lie at angles to the axis of the cutter. Preferably, as shown, the entire teeth k are obliquely inclined, and not merely the front cutting faces m thereof. Preferably, each tooth k is generally helical in form and each cutting face m conforms to a helicoid. As illustrated in Figs. 3 and 4, the helicoid is one formed by a generatrix following the axis of the cutter and also following a helix on the cylinder concentric with the axis thereof, the helicoid in this case being radial. However, the character of the helicoid may be varied. The teeth and the cutting faces my be inclined in either direction and the degree of inclination may be varied as required.

The outer edge of each cutting face m has an outline which is shaped to cut the predetermined contour when the cutter is rotated, this outline of the cutting face following the helicoidal surface thereof. In other words, the cutting edge is of such form that the projection of said edge about the axis of the cutter upon an axial plane of intersection is the same as the said predetermined contour. It will be understood that this predetermined contour is in the present case the contour a, b, c, d, e, f, g, h already described in connection with the former F, this contour being illustrated in Fig. 5.

Each tooth of the cutter is relieved along lines n which extend backward and inward from the outline of the cutting face, these relief lines forming a continuous surface or continuous surfaces which extend from end to end of the cutter and which are properly constructed notwithstanding the variations in radius at different points along the said outline and notwithstanding the variations in angular position resulting from the warped or helicoidal cutting face. Preferably, the relief lines n are maintained in similar relationship to each tooth as they extend backward and inward, the lines preferably conforming to spirals of Archimedes. The result is that each tooth of the cutter at any axial plane of intersection has a distorted shape but is nevertheless adapted to cut the correct predetermined contour when rotated. When the relief lines n conform to spirals and are maintained in similar relationship as they extend backward and inward, as is preferred, it is possible to sharpen or grind the teeth of the cutter on the front cutting faces m without changing the effective contour.

By reference to Figs. 3 and 4 it will be seen that the inclination and spacing of the teeth are such that the relieved surface of each tooth of the cutter extends backward toward the following tooth to an extent beyond that to which it could be cut by a preliminary shaped milling cutter having a length equal to that of the first said cutter. Frequently as shown the forward outer corner o of each tooth is in advance of the opposite rear outer corner p of the next preceding tooth, but this relationship is not essential.

When the cutter has been finished it is adapted for use in any usual or ordinary milling machine for cutting a work piece P such as shown in section in Fig. 6. This work piece also has the said contour a, b, c, d, e, f, g, h and the contours of the former and of the work piece are therefore identical with each other and are also identical with the effective contour of the cutter A.

It will be seen that in accordance with the invention, I have provided certain new and useful combinations of parts. One combination consists of the former and the novel cutter having identical contours and having certain parts of the said contours inclined in excess of the critical angle which has been before described; and another combination consists of the said former, the said novel cutter made therefrom and the work piece cut by the cutter, all three having exactly the same contours and having parts of the contours inclined at an angle in excess of the foresaid critical angle.

I do not narrowly limit myself as concerns the manner of making the cutter A as shown in Figs. 3 and 4, but in order that there may a full disclosure of the invention it is necessary or advisable to disclose how the cutter may be made. In Figs. 7 to 10 of the drawings I have shown parts of a machine adapted for making the cutter. This machine in its entirety is presented in my copending application for relieving machines, Serial No. 286,524, filed March 31, 1919, and the method that is followed in using the machine and in making the cutter herein set forth is presented in my copending application for methods of making milling cutters, Serial No. 326,875, filed September 27, 1919.

1 represents the main frame or bed upon which the other parts of the machine are mounted. For carrying the blank for the tool to be formed and relieved, there is provided a head stock 2 and preferably also a tail stock 3. A tool-holding-and-operating mechanism is provided, as shown at 4. Preferably the headstock 2 and the tailstock 3 are so arranged as to hold the blank against longitudinal movement, the tool mechanism 4 being moved longitudinally along the blank in the manner to be presently set forth. When the machine is so constructed, the headstock 2 is fixedly secured to the bed, preferably being formed in part integrally therewith, as shown. The tailstock 3 is adjustable along the bed to accomodate blanks or blank arbors of different lengths.

The headstock 2 is provided with a rotatable spindle 5 mounted in bearings 6 and 7. Secured to the spindle is a collet chuck 8 which may be of any usual or preferred form and which is adapted to grip either the shank of the tool to be formed and relieved or an arbor upon which the tool is mounted. As illustrated in Fig. 8 there is a blank A mounted upon an arbor B, the arbor being engaged by the chuck 8. For rotating the spindle 5 there is provided a worm wheel 9 meshing with a worm on a transverse rotatable shaft 11.

The tool mechanism 4 includes a carriage 21 which is longitudinally movable along ways 22 and 23 on the bed 1. Mounted for transverse movement with respect to the carriage 21 is a slide 24, this slide carrying the cutting tool 25. The tool 25 is preferably very narrow, but if desired a wider tool can be used in certain conditions. For supporting the former 26 there is provided a bracket 28 rigidly secured to the bed 1.

As illustrated, there is provided a former F carried by the bed and a former pin 27 carried by the slide 24. The former F as already explained, has exactly the contour with which the blank is to be formed and the former pin 27 has exactly the same size and shape as the cutting tool 25. The pin is detachably secured to the slide 24 so that it can be removed and another pin be substituted corresponding to a tool differing in size or shape from the tool 25 which is shown.

In order that the tool may be given relieving movements to properly relieve the several teeth on the blank, it is not rigidly secured to the slide 24 but is transversely movable thereon. Mounted on the slide 24 is a slide 37 which is transversely movable along a suitable guideway. Carried in part by the slide 24 is a mechanism for effecting regular reciprocating relieving movements of the slide 37 and the tool in suitable timed relation with the rotative movement of the blank. In order that the tool may be adjusted for blanks of different sizes, there is provided a tool-carrying slide 38 transversely adjustable on the slide 37. It will be observed that with the construction described the tool maintained in parallelism as it moves longitudinally for feeding or inward and outward to follow the contour.

The relieving mechanism for moving the slide 37 together with the tool 25 includes a rotatable relieving cam 46 which is mounted on the slide 24 so as to be bodily movable therewith. As shown, the cam is mounted on a longitudinal rotatable shaft 47 mounted in bearings 48 and 49 on a bracket 50 depending at the front of the slide 24. A lever 51 is pivoted between its ends on the slide 24 and at its lower end is provided with a roller engaging the cam 46. The upper end of the lever engages an abutment 52 on the slide 37. A coil spring 53 is interposed between the slide 37 and the slide 24, this spring tending to press the slide 37 forward, thus holding the abutment 52 in firm contact with the upper end of the lever 51. It will be seen that when the cam 46 is rotated the lever 51 will be oscillated, thus giving a reciprocating movement to the slide 37 and to the tool 25. The shape of the cam 46 is such that the slide 37 is moved forward relatively slowly at a uniform rate so that the tool may effect a relieving cut, and is then drawn back relatively rapidly so as to withdraw the tool and position it for another cut.

As before stated, the cam 46 is driven in timed relation with the blank rotation. For rotating the cam, I make use of the aforesaid transverse shaft 11. Positioned immediately below the shaft 11 is a shaft 54 which is mounted partly in the main frame and partly in a bracket 55 secured thereto. For connecting the two shafts 11 and 54 there is provided a gear 56 on the shaft 11, a gear 57 on the shaft 54 and an idler gear 58 meshing with the two gears 56 and 57. The idler gear is mounted on a bearing stud 59 carried by an adjustable slotted arm 60. The speed ratio between the two shafts 11 and 54 can be changed by removing one or both of the gears 56 and 57 and substituting other gears of different diameters, it being clear that the idler gear 58 can be adjusted to mesh with such differently diametered gears. Mounted in the said bracket 55 is a vertical shaft and this shaft is driven from the shaft 54 by means of bevel gearing 63. By means of bevel gearing 64 the shaft 62 serves to drive a longitudinal splined shaft 65. This shaft is supported partly in a bearing 66 secured to the bed and partly in bearings 67 in a depending bracket 68 secured to the carriage 21.

Mounted on the shaft 65 between the bearings 67 and splined to the shaft, is a worm 69. This worm meshes with a worm wheel 70 which is connected with a transverse shaft 71. The worm wheel and the shaft are rotatably mounted in a bearing 72 formed in the bracket 68, and in a bearing 73 formed on a supplemental bracket 74 secured to the bracket 68. Slidably mounted on the shaft 71 is a bevel gear 75, and this gear is engaged by a bearing 76 on the aforesaid bracket 50 depending from the front end of the slide 24. The bevel gear 75 meshes with a bevel gear 77 on the shaft 47. The bevel gear 75 and the shaft 71 are splined or otherwise suitably constructed so that the bevel gear is rotated, but is at the same time free to move transversely of the machine when the slide 24 is moved. Inasmuch as the bevel gears 75 and 77 are both supported by the bracket 50, they are at all times held in mesh. It will be seen that with this construction power is transmitted from the shaft 11, through the several parts that have been described, to the shaft 65, and is transmitted from the shaft 65 to the shaft 47 and the cam 46, the connection between the shaft 65 and the shaft 47 being such that free transverse movement of the cam and associated parts is permitted. The cam 46 is given one complete rotation for each tooth of the blank.

In order that blanks with helical teeth may be properly formed and relieved, it is necessary to effect the relieving movements of the tool in peculiar relation to the rotative movement of the blank so that the relief may be in conformity with the helical teeth. I have stated that the relieving movements of the tool are effected in timed relation to the rotative movement of the blank; and, for any given position of the carriage, this timed relation is fixed and definite, but when the carriage is moved to bring the tool into a new cutting position, it is necessary to vary the relation between the relieving movements of the tool and the rotative movement of the blank.

In the construction illustrated, the worm 9 is not connected directly with the spindle 5 but is connected indirectly by means of suitable gearing 78 which can be supplementally moved to change the spindle rotation. By preference, this gearing is bodily rotatable and includes a rack and pinion, the rack being longitudinally slidable in accordance with the longitudinal movements of the carriage 21. Coaxially mounted with the spindle 5 is a sleeve 79, this being supported in bearings 80 and 81 in the headstock. The inner end of the sleeve preferably extends into and has a bearing in the outer end of the spindle. The aforesaid worm 9 is rigidly secured to the sleeve 79. Associated with the spindle is a frame 82 which is recessed to receive the outer end of the spindle and engage the outer surface thereof. Slidably mounted in the sleeve 79 is a shaft 83 having rack teeth formed thereon at 84. The shaft 83 is splined to the sleeve 79 so as to be rotatable therewith. Rotatably mounted in bearings in the frame 82 is a transverse shaft carrying a pinion 86 which meshes with the rack teeth 84. Also rotatably mounted in the frame 82 is a transverse shaft 87. The two shafts 85 and 87 are connected by spur gears 88 and 89. Also rotatably mounted in the frame 82 is a third rotatable shaft, to which is secured a worm 91. This worm meshes with worm teeth 92 formed in the periphery of the spindle 5 near the end thereof. At the side of the bracket 82 opposite from the gears 88 and 89 there is provided gearing (not shown) for connecting the shafts 87 and 90.

Carried by the shaft 83 at the outer end thereof is an annularly grooved collar 100. Rigidly secured to the main frame adjacent the shaft 83 is a longitudinal guide stud 101. Slidably mounted on the stud 101 is a bracket 102 having a fork 103 entering the groove in the collar 100. The bracket 102 is apertured to receive a longitudinal rod 104, which is connected at its right-hand end with the carriage 21. The bracket 102 can be clamped to the rod 104 in any desired relative position.

It will be seen that when the carriage 21 is moved longitudinally along the bed the rod 104, together with the bracket 102, will be moved at the same time and to the same extent. By reason of the engagement of the fork 103 with the collar 100 the shaft 83 is similarly moved, thus moving the rack teeth 84. When the rack slides longitudinally the pinion 86 is turned and this serves, by means of the gearing and the several shafts that have been described, to turn the worm 91. The rotative movement of the worm 91 serves to turn the spindle 5 relatively to the frame 82 and the sleeve 79. It will be understood, as before stated, that the entire gearing 78 rotates bodily with the sleeve 79. It will therefore be clear that the relative movement of the spindle with respect to the sleeve simply serves to either increase or decrease the spindle rotation to a certain extent. However, the relative movement of the spindle is determined by the longitudinal movement of the rack 84, which in turn is determined by the longitudinal movement of the carriage 21 and of the cutting tool 25 carried thereby. Inasmuch as the relieving cam reciprocates the tool with a frequency which is normally uniform, and inasmuch as the spindle and the blank are given a changed rotation which is in exact proportion to the longitudinal movement of the carriage and the tool, it is clear that the relieving movements are effected in such relation to the blank as to be in conformity with helical teeth.

For moving the carriage longitudinally along the bed there is provided a screw 107 which engages a nut 108 carried by a bracket 109 depending from the carriage. The screw is supported at its left-hand end in a bearing 110 formed in a bracket 111 secured to the bed. Mounted in the bracket 111 is a transverse shaft 112 which is connected with the screw 107 by means of bevel gearing 113. At the front end of the shaft 112 is a hand wheel 114 by means of which the screw may be turned manually to move the carriage. In order that the carriage may be moved automatically to feed the tool from one cutting position to another, a suitable mechanism is provided. This mechanism is adapted to feed the carriage intermittently. Mounted in the bracket 111 is a transverse bearing pin 115 upon which is mounted a gear 117 which meshes with a gear 118 on the shaft 112. Connected with this gear 117 is a ratchet wheel 119. Loosely mounted on the hub of the ratchet wheel is a swinging arm 123. Pivotally connected with this arm near the lower end thereof is a link 124 which is adjustably connected at its left-hand end with an oscillating crank arm 125. The crank arm is secured to a transverse rock shaft 126 which carries at its rear end a lever 128. Carried by the lever at the upper end thereof is a roller positioned to be engaged by a cam 130 on a longitudinal rotatable shaft 131. Mounted on the swinging arm 123 is a pawl 133 adapted to engage the ratchet wheel 119. A pawl 134, which is mounted adjacent the pawl 133, is adapted to engage a ratchet wheel that is mounted adjacent the ratchet wheel 119. Either pawl can be thrown into or out of engagement with the corresponding wheel. The shaft 131 is rotated in the manner to be presently described, and it will be seen that at each rotation thereof the arm 128 and the crank arm 125 are oscillated. By means of the link 124 the oscillation of the crank arm 125 is transmitted to the arm 123, the extent of oscillation of the arm being adjustable by changing the connection between the link and the crank arm. By means of the ratchet 133 the pawl wheel 119 is turned through a small angle, thus turning the shaft 112 and the lead screw 107 and moving the carriage.

The machine includes two alternately operable mechanisms one for turning the spindle and reciprocating the tool for effecting relief, and the other for feeding the tool. These mechanisms are not herein shown or described in detail. It is desirable to feed the tool longitudinally while out of engagement with the blank, that is, when the tool is opposite the groove between two teeth of the blank. The blank is turned through approximately one revolution and is preferably mounted in the spindle so that at the position of stopping the tool will be opposite a groove. The grooves are helical but the spindle and the blank are supplementally turned at each longitudinal movement this supplemental turning exactly compensating for the inclination of the grooves and insuring the stopping of the blank with a groove opposite the tool.

Preferably the tool is withdrawn at the time of each longitudinal movement, the former pin also being withdrawn from engagement with the former. This withdrawal is effected by mechanism operated by the shaft 131, which operates intermittently, the withdrawal being properly timed with respect to the feeding movement. Associated with the slide 24 is an abutment 180 which is engaged by the upper end of a lever 181 longitudinally pivoted to the cariage 21. The lower end of the lever is provided with a roller which is adapted to be engaged by a cam plate 182 on a cam disk 183 secured to the shaft 131. At the beginning of the rotation of the shaft 131 the cam plate 182 engages the roller on the lever 181 and swings it in the counter-clockwise direction, thus moving the abutment 180 together with the slide 24 toward the front. In this way the tool 25 is withdrawn from the blank and the former pin 27 is withdrawn from the former 26. As the shaft 131 continues to rotate, the cam 130 operates the feeding mechanism in the way already described, and the carriage is moved longitudinally along the bed. After that the cam plate 182 permits the lever 181 to return to the position shown, and the slide 24 moves rearward permitting the tool 25 and the former pin 27 to move to their new operative positions. It will be seen that by thus withdrawing the former pin from the former at the time of longitudinal movement, I avoid any difficulties incident to forcing the former pin along the former while in contact therewith. If the former pin were maintained in contact with the former at all times difficulty would be experienced in effecting the longitudinal movement, particularly at places where the contour of the former is sharply inclined. For steep inclines such as herein illustrated, it would be impossible to thus move the former pin.

Preferably the former pin is restored to engagement with the former by a relatively slow movement with a minimum of pressure, so that there will be no tendency to bend or distort the pin or to secure uneven contact between the pin and the former. For this purpose I provide a mechanism for returning the carriage which is entirely independent in its operation from the mechanism for withdrawing it. The before mentioned abutment 180 is not connected directly to the slide 24 but is connected to a second slide 184 which is transversely movable independently of the first slide 24. Springs 185 are interposed between the slide 184 and the carriage 21 and these springs tend to move the slide 184 rearward, thus holding the abutment 180 at all times in engagement with the lever 181.

The two slides 24 and 184 are ordinarily connected by a lock. As shown most clearly in Fig. 10, the lock includes a plate 186 located in a recess in the top of the slide 24. The plate is provided with a boss which projects downward through a slot in the slide, and threaded into this boss is a vertical stud 187. This stud extends through and closely fits an aperture in the slide 184. Pivoted to the slide 184 are two small bell-crank levers 188, these levers having horizontal upper arms which engage a collar on the stud 187. The lower ends of the levers are adapted to be engaged by a tapered cam bushing 189 vertically movable on the stud. When the bushing 189 is in its lower position, as shown, the levers 188 are forced outward, thus drawing the stud 187 downward and forcing the plate 186 into clamping engagement with the slide 24. In this way the slide 24 is firmly connected with the slide 184. When the bushing 189 is in its raised position, the levers 188 swing inward, thus permitting the stud 187 to move upward and release the plate 186 from its clamping engagement with the slide 24. For moving the bushing 189 there is provided a forked lever 190 having projections engaging slots or notches in the bushing. This lever is secured to a longitudinal rock shaft 191 mounted in bearings in the carriage 21. Connected with the lever 190 is a lever 192 having a roller which is adapted to be engaged by cam plates 193 and 194 secured to a cam disk 195 mounted on the shaft 131. It will be seen that as the shaft 131 rotates, the cam plate 193 engages the roller on the lever 192, thus moving the lever 190 and the cam bushing 189 upward and releasing the lock. Subsequently the roller is engaged by the cam plate 194, thus moving the cam bushing 189 downward and re-engaging the lock.

I have already stated that a supplemental mechanism is provided for returning the slide after it has been withdrawn in the way before described. Preferably, in order that this supplemental returning mechanism may operate without being affected in any way by the return movement of the slide 184, and in order further that the slide 24 may be returned with a minimum of effort, I provide a supplemental means for supporting the slide 24 after it has been unlocked from the slide 184. As illustrated, the carriage 21 is provided near its front and rear with transverse pivot pins 196 and 197. The carriage is slotted adjacent the pins, and in these slots are positioned arms 198 and 199 respectively pivoted on the said pins. The arms are respectively provided with rollers 200 and 201 which are adapted to engage the bottom of the slide 24. The arms are connected by pivoted links 202, and these links in turn are connected by a transverse yoke 203. The yoke 203 is provided with slots or notches in which fit pivot bosses projecting upward from the lever 190. The result is that when the lever 190 is swung upward to release the lock, the arms 198 and 199 are swung in a clockwise direction, thus swinging the rollers 200 and 201 upward so as to lift the slide 24 off from the slide 184 and support it independently. The actual raising of the slide may be but a few thousandths of an inch. For returning the slide 24 rearward as soon as it has been released by the lock and elevated by the rollers, there are provided coil springs 205. Preferably these springs are located in long transverse cylindrical apertures 206 in the slide 24. The springs abut at their rear ends against plugs 207 threaded into the apertures, and at their front ends abut against heads 208 on transverse rods 209. The rods 209 extend through central openings in the plugs 207 and are connected at their rear ends with brackets 210 on the carriage 21. Preferably the heads 208 are in the form of pistons and the forward parts of the apertures 206 constitute cylinders 211 in which the pistons 208 fit and move. Secured to the slide 24 is a casting 212 having a transverse passageway which communicates at its ends with the cylinders 211. Also formed in the casting 212 is a fluid reservoir 214. Leading from the passageway 213 into the reservoir 214 is a restricted aperture 215 which is preferably controlled by an adjustable needle valve 216. Leading from the reservoir 214 back to the passageway 213 is an automatic check valve 217. The cylinders 211 together with the passageway 213 and a part of the reservoir 214 are filled with a suitable fluid, which is preferably a liquid such as oil. It will be seen that as soon as the slide 21 has been elevated and released from the slide 184, the springs 206 tend to move it rearward. This tendency, however, is resisted by the engagement of the pistons 208 with the liquid in the cylinders. This engagement forces the liquid out of the cylinders into the passageway 213 and thence into the reservoir 214 through the restricted aperture 215. The liquid can pass through this aperture only relatively slowly, and thus the return movement of the slide is made to take place very slowly. When the slide is moved quickly forward at the time of next feeding, the check valve 217 opens to permit the liquid to flow from the reservoir 14 back to the passageway 213 and the cylinders 211. The slow return movement causes the former pin to engage the former gently and with a minimum force, so that there is little or no tendency to bend or deflect the parts. In this way I avoid any excessive or variable deflection or distortion such as would affect the contour of the cutter.

It will be noted that the several cams 130, 182, 193 and 194 are so positioned in relation to each other that the operations which they respectively control take place in the following order. First the two slides 184 and 24 are moved backward in unison, they being still locked together. Then the slide 24 is unlocked from the slide 184 and is at the same time elevated on the rollers 200 and 201. At or about the same time the carriage is moved longitudinally to feed the tool to a new cutting position. Then the slide 184 is permitted to return to its normal position.

In the meantime the slide 24 is being moved slowly rearward under the control of the springs 205 and the fluid regulating mechanism. After the completion of the return movement of the slide 24, the rollers 200 and 201 are lowered and the slide is again locked to the slide 184.

It is believed that the general operation of the machine will be clear from the foregoing description and that a very brief summary will suffice. A former F is provided having the desired contour and a blank is put in place, this blank having been previously grooved and roughed out in any usual or preferred manner. The gearing 78 is adjusted in accordance with the degree of inclination of the helical teeth on the blank and the gearing 56—57 is adjusted in accordance with the number of teeth on the blank. The tool is adjusted transversely and longitudinally into engagement with the blank at the right-hand end thereof. Then the machine is started, the spindle 79 and the operating shaft 131 operating alternately in succession. During the rotative movement of the blank relieving movements of the tool are effected as described, thus cutting the desired relief on the teeth of the blank. After one complete revolution of the blank the rotative movement of the spindle is stopped and also the relieving movements of the tool. The carriage is then fed longitudinally toward the left, the blank turning slightly in conformity with the helical teeth. Just prior to the longitudinal movement the tool slide is withdrawn, thus withdrawing the tool from the blank and the former pin from the former. After the longitudinal movement, the tool slide is moved slowly in the opposite direction, thus gently returning the former pin to the former which is engaged at a new position. The tool assumes a corresponding position with respect to the blank. After this movement of the tool and former pin the blank is again rotated through one revolution and these movements are repeated alternately in succession until the blank is completely formed. It will be seen that with the step-by-step movements described and with a fine feed the former pin can follow or climb a very sharply inclined portion of the contour of the former, the tool being caused to cut a similarly inclined part of the contour of the cutter.

In Figs. 12 and 13 I have shown a cutter C which is similar to the cutter A but which differs in that the forward outer corner of each tooth is not actually in advance of the opposite rear outer corner of the next preceding tooth. However, the actual space between the two teeth is so small that the relief surface of each tooth cannot be cut by preliminary shaped milling cutter having a length equal to that of the cutter to be made.

The cutter C has teeth $q$ with spaces $r$ between them and the front helicoidal cutting faces of the teeth are represented by $s$. The effective contour of each helicoidal face includes the points $u$, $v$, $v$, and $u$. The outer surfaces of the teeth are relieved and preferably the relief lines $t$ are maintained in similar relationship to each other as they extend backward and inward, the lines conforming to spirals of Archimedes. The result is that each tooth of the cutter, at any axial plane of intersection, such as 14—14, has a distorted shape, as shown by dotted lines in Fig. 14. This distorted shape includes points $u'$, $v'$, $v'$, $u'$ on the outline of the cutting face. The distortion of shape results from the fact that the successive inward inclined relief lines $t$ start at different angular positions because of the inclined or helicoidal cutting face. Therefore with the cutting face inclined in the direction illustrated the several points $v'$, $v'$ and $u'$ to the left of the point $u$ or $u'$ are spaced inward from the respective points $v$, $v$ and $u$ by progressively increasing distances. Notwithstanding this distortion in shape at an axial plane of intersection, the outline or effective contour at the cutting face is correct, as before stated.

The cutter C can be made by the method already described but when the successive teeth do not actually overlap it is also possible to make the cutter by means of a shaped lathe tool formed in a novel manner in accordance with the method set forth in my Patent No. 1,348,298, dated August 3, 1920.

In practicing the said method there is provided a cutter S which is provided with generally longitudinal teeth $w$ which are separated by grooves F and which have front cutting faces $y$. Each tooth of the preliminary cutter S has at any axial plane of intersection such as 16—16 a shape $u$, $v$, $v$, and $u$ which is the same as the predetermined contour of the cutter C, as shown by dotted lines in Fig. 16. While the contour is the same it is reversely positioned with respect to the axis, the points which are outermost on the final cutter being innermost on the preliminary cutter and vice versa.

Each cutting face of the preliminary cutter has a degree of inclination which bears a predetermined ratio to the degree of inclination of the cutting face of each tooth of the final cutter C. Any convenient ratio between the degrees of inclination or between the longitudinal pitches may be selected, but is usually most convenient to provide the preliminary cutter S with helicoidal faces which are constructed with the same degree of inclination, and therefore with the same longitudinal pitch, as that of the helicoidal faces of the final cutter C, the ratio in this case being one to one. In this case, as shown in Fig. 15 of the drawings, the ratio of the degrees of inclination is one to one, and the ratio of the longitudinal pitches is also one to one. The helix along which travels the generatrix of a helicoid of a tooth of the preliminary cutter S, has the same longitudinal pitch as has the corresponding helix for a helicoid of a tooth of the final cutter C.

Each tooth of the preliminary cutter has a degree of relief which bears a predetermined ratio to the degree of relief of the teeth of the final cutter. As before stated, it is usually most convenient to make the degrees of inclination the same, that is to make the two cutting faces correspond to similar helicoids as illustrated in Fig. 15. In this case the ratio of the degrees of inclination is one to one, and the inverse of this ratio is also one to one. Therefore for this special case the degrees of relief for the two cutters are the same. As applied to the cutters S and C, the decrease in radius for each increment of angular advance of the cutter S is the same as the decrease in radius for each increment of angular advance of the cutter A.

As the result of the intersection of the helicoidal cutting face of each tooth of the cutter S with the spiral relief lines thereof, the outline or contour of the cutting face is distorted, as shown by full lines in Fig. 16. This distorted contour has points $u'$, $v'$, $v'$, and $u'$, all points $v$, $v$ and $u$ to the right of the points $u'$ and $u$ being spaced outward from the respectively corresponding points $v'$, $v'$ and $u'$ by progressively increasing distances. Inasmuch as the teeth of the preliminary cutter S are provided with helicoidal cutting faces having the same pitch as the helicoidal cutting faces of the teeth of the final cutter C and are provided with the same degree of relief as the teeth of the final cutter, the extent of distortion is the same as that of the cutter C at an axial plane of intersection. The actual inclination of each cutting face of the cutter S is less by reason of the smaller diameter but the amount of relief is more for the same reason, and these differences exactly compensate for each other.

When a lathe tool is to be used the preliminary cutter S is used to mill an intermediate tool W, as shown in Fig. 15, providing the said tool at its cutting face $w'$ with a distorted contour which is the same as the effective contour of the cutter S shown by full lines in Fig. 16. This distorted contour is illustrated in the plan view in Fig. 17, the contour having points $u'$, $v'$, $v'$, and $u'$, corresponding respectively to the points $u'$, $v'$, $v'$, and $u'$ of the effective contour of the cutter S. It will be observed that the tool W is formed without relief, it being fed perpendicularly to its cutting face as indicated by the arrow in Fig. 15.

The intermediate tool W is used, as shown in Fig. 18, for cutting the lathe tool X. The tool X has a cutting face $x'$ and has its front face $y'$ inclined with respect to the cutting face to provide the necessary relief. The tool W is set with its cutting face $w'$ parallel with the cutting face $x'$ of the tool X, and relative reciprocation is then effected along lines parallel with the front face $y'$. The result is that the cutting face $x'$ is formed with a distorted contour which is exactly the same as the distorted contour of the face $w'$ of the tool W. This distorted contour is shown in Fig. 19 and it has points $u'$, $v'$, $v'$, and $u'$ corresponding respectively to the points $u'$, $v'$, $v'$, and $u'$ of the cutter W.

Fig. 20 shows the tool X being used for shaping the cutter C. It will be understood that the blank for the cutter C is rotated as indicated by the arrow and that the tool X is moved inward and outward in timed relation to the rotation to provide relief. The distortion of the shape of the tool X is just sufficient to offset the distortion which would otherwise take place in the cutter A, and the result is that the cutter A is formed with the correct effective contour.

What I claim is:

1. A milling cutter for cutting a predetermined irregular contour consisting in part of a line or lines inclined with respect to the axis at an angle or angles in excess of the maximum angle at which a longitudinally fed former pin will follow outward along an inclined part of a predetermined former, the said cutter comprising a plurality of generally longitudinal teeth each provided with a helicoidal front cutting face with an outer cutting edge of such form that the projection of said edge about the axis of the cutter upon an axial plane of intersection is the same as the said predetermined contour, the outer surface of each tooth behind the helicoidal cutting face being relieved along lines extending backward and inward from the outer edge of the face in uniform relationship whereby the cutter may be ground on the helicoidal faces without changing the effective contour, and the inclination and spacing of the teeth being such that the relieved surface of each tooth extends backward toward the next following tooth to an extent beyond that to which it could be cut by a preliminary shaped milling cutter having a length equal to that of the first said cutter.

2. A milling cutter for cutting a predetermined irregular contour consisting in part of lines inclined in opposite directions with respect to the axis at angles in excess of the maximum angle at which a longitudinally fed former pin will follow outward along an inclined part of a predetermined former, the said cutter comprising a plurality of generally longitudinal teeth each provided with a helicoidal front cutting face with an outer cutting edge of such form that the projection of said edge about the axis of the cutter upon an axial plane of intersection is the same as the said predetermined contour, the outer surface of each tooth behind the helicoidal cutting face being relieved along lines extending backward and inward from the outer edge of the face in uniform relationship whereby the cutter may be ground on the helicoidal faces without changing the effective contour, and the inclination and spacing of the teeth being such that the relieved surface of each tooth extends backward toward the next following tooth to an extent beyond that to which it could be cut by a preliminary shaped milling cutter having a length equal to that of the first said cutter.

3. A milling cutter for cutting a predetermined irregular contour consisting in part of lines inclined in opposite directions at angles in excess of 60° with respect to the axis, the said cutter comprising a plurality of generaly longitudinal teeth each provided with a helicoidal front cutting face with an outer cutting edge of such form that the projection of said edge about the axis of the cutter upon an axial plane of intersection is the same as the said predetermined contour, the outer surface of each tooth behind the helicoidal cutting face being relieved along lines extending backward and inward from the outer edge of the face in uniform relationship whereby the cutter may be ground on helicoidal faces without changing the effective contour, and the inclination and spacing of the teeth being such that the relieved surface of each tooth extends backward toward the next following tooth to an extent beyond that to which it could be cut by a preliminary shaped milling cutter having a length equal to that of the first said cutter.

4. A milling cutter for cutting a predetermined contour differing from a straight line and consisting in part of lines inclined in opposite directions with respect to the axis at angles in excess of the maximum angle at which a longitudinally fed former pin will follow outward along an inclined part of a predetermined former, the said cutter comprising a plurality of generally longitudinal teeth each provided with a helicoidal front cutting face with an outer cutting edge of such form that the projection of said edge about the axis of the cutter upon an axial plane of intersection is the same as the said predetermined contour, the outer surface of each tooth behind the helicoidal cutting face being relieved along lines extending backward and inward from the outer edge of the face in uniform relationship whereby the cutter may be ground on the helicoidal faces without changing the effective contour, and the inclination and spacing of the teeth being such that the forward outer corner of each tooth is in advance of the opposite rear outer corner of the next preceding tooth.

5. A milling cutter for cutting a predetermined irregular contour and consisting in part of non-circular curves and in part of a line or lines inclined with respect to the axis at an angle or angles in excess of the maximum angle at which a longitudinally fed former pin will follow outward along an inclined part of a predetermined former, the said cutter comprising a plurality of generally longitudinal teeth each provided with a helicoidal front cutting face with an outer cutting edge of such form that the projection of said edge about the axis of the cutter upon an axial plane of intersection is the same as the said predetermined contour, the outer surface of each tooth behind the helicoidal cutting face being relieved along lines extending backward and inward from the outer edge of the face in uniform relationship whereby the cutter may be ground on the helicoidal faces without changing the effective contour, and the inclination and spacing of the teeth being such that the relieved surface of each tooth extends backward toward the next following tooth to an extent beyond that to which it could be cut by a preliminary shaped milling cutter having a length equal to that of the first said cutter.

6. A milling cutter for cutting a predetermined irregular contour and consisting in part of non-circular curves and in part of lines inclined in opposite directions with respect to the axis at angles in excess of the maximum angle at which a longitudinally fed former pin will follow outward along an inclined part of a predetermined former, the said cutter comprising a plurality of generally longitudinal teeth each provided with a helicoidal front cutting face with an outer cutting edge of such form that the projection of said edge about the axis of the cutter upon an axial plane of intersection is the same as the said predetermined contour, the outer surface of each tooth behind the helicoidal cutting face being relieved along lines extending backward and inward from the outer edge of the face in uniform relationship whereby the cutter may be ground on the helicoidal faces without changing the effective contour, and the inclination and spacing of the teeth being such that the relieved surface of each tooth extends backward toward the next following tooth to an extent beyond that to which it could be cut by a preliminary shaped milling cutter having a length equal to that of the first said cutter.

7. A milling cutter for cutting a predetermined irregular contour consisting in part of a line or lines inclined with respect to the axis at an angle or angles in excess of the maximum angle at which a longitudinally fed former pin will follow outward along an inclined part of a predetermined initially constructed former, the said cutter comprising a plurality of generally longitudinal teeth each provided with a helicoidal front cutting face with an outer cutting edge of such form that the projection of said edge about the axis of the cutter upon an axial plane of intersection is shaped to conform to that of an initially constructed former such as aforesaid, the outer surface of each tooth behind the helicoidal cutting face being relieved along lines extending backward and inward from the outer edge of the face in uniform relationship whereby the cutter may be ground on the helicoidal faces without changing the effective contour, and the inclination and spacing of the teeth being such that the relieved surface of each tooth extends backward toward the next following tooth to an extent beyond that to which it could be cut by a preliminary shaped milling cutter having a length equal to that of the first said cutter.

8. A milling cutter for cutting a predetermined irregular contour consisting in part of lines inclined in opposite directions at angles in excess of the maximum angle at which a longitudinally fed former pin will follow outward along an inclined part of a predetermined initially constructed former, the said cutter comprising a plurality of generally longitudinal teeth each provided with a helicoidal front cutting face with an outer cutting edge of such form that the projection of said edge about the axis of the cutter upon an axial plane of intersection is shaped to conform to that of an initially constructed former such as aforesaid, whereby the said initially constructed former and a finally constructed work piece cut by the cutter will have contours that are identical with each other and also identical with the effective contour of the cutter, the outer surface of each tooth behind the helicoidal cutting face being relieved along lines extending backward and inward from the outer edge of the face in uniform relationship whereby the cutter may be ground on the helicoidal faces without changing the effective contour, and the inclination and spacing of the teeth being such that the relieved surface of each tooth extends backward toward the next following tooth to an extent beyond that to which it could be cut by a preliminary shaped milling cutter having a length equal to that of the first said cutter.

9. The combination of an initially constructed former having an irregular contour consisting in part of lines inclined in opposite directions at angles in excess of the maximum angle at which a longitudinally fed former pin will follow outward along an inclined part of a predetermined former, and a subsequently constructed milling cutter comprising a plurality of generally longitudinal teeth each provided with a helicoidal front cutting face with an outer cutting edge of such form that the projection of said edge about the axis of the cutter upon an axial plane of intersection is shaped to conform to that of the former, the outer surface of each tooth behind the helicoidal cutting face being relieved along lines extending backward and inward from the outer edge of the face in uniform relationship whereby the cutter may be ground on the helicoidal faces without changing the effective contour, and the inclination and spacing of the teeth being such that the relieved surface of each tooth extends backward toward the next following tooth to an extent beyond that to which it could be cut by a preliminary shaped milling cutter having a length equal to that of the first said cutter.

In testimony whereof, I hereto affix my signature.

FRIEDERICH MÜLLER.